Sept. 3, 1935. T. J. HOWLAND 2,013,410
WATER ANIMAL
Filed Oct. 27, 1934
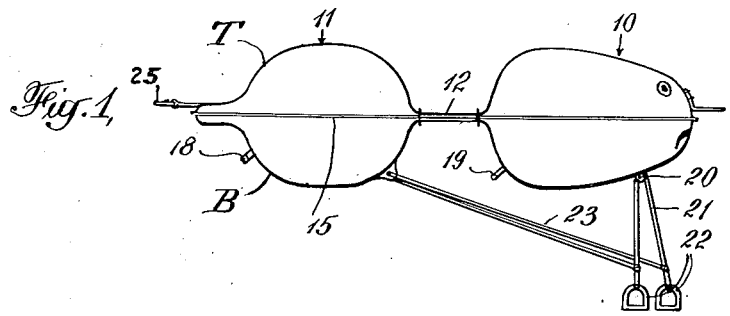
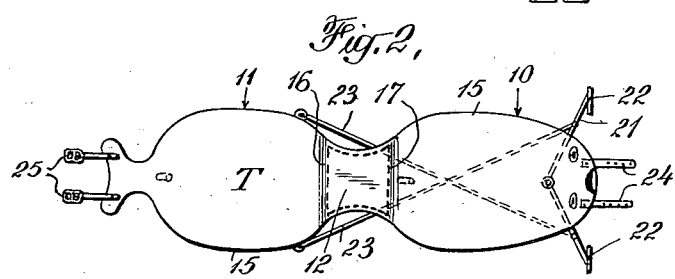
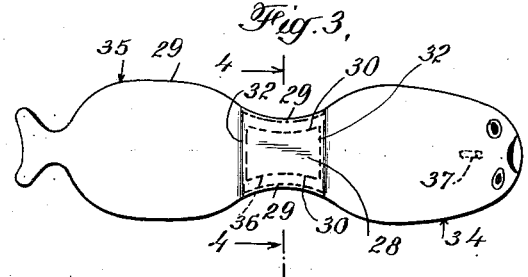 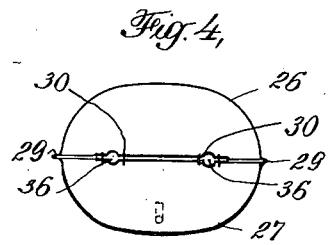
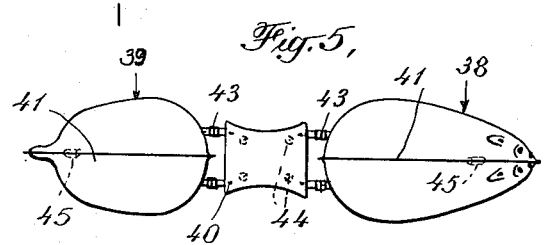
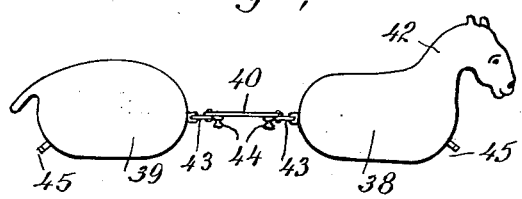
INVENTOR
Thomas J. Howland
BY
Pennie, Davis, Marvin & Edmonds
ATTORNEYS Patented Sept. 3, 1935

2,013,410

UNITED STATES PATENT OFFICE 2,013,410

WATER ANIMAL

Thomas J. Howland, Long Branch, N. J.

Application October 27, 1934, Serial No. 750,315

10 Claims. (Cl. 9—11)

This invention relates to pneumatic water-sports devices such as hollow rubber animals and similar articles which when inflated assume various shapes and are adapted to be mounted in the water by bathers in a straddle-wise position. More particularly, the invention is concerned with a novel water-sports article which may be used with ease and safety to the bather, and which may be combined with other similar units to afford a variety of amusements.

Pneumatic water animals as commonly made consist of a single rubber body which when filled with air under pressure assumes a generally elongated shape of sufficient proportions to float a person's weight. Water animals of this variety are characterized by the difficulty which the bather encounters in maintaining an equilibrium when astride the animal, and this difficulty is due largely to the presence of a considerable quantity of air under pressure within the portion of the animal forming the seat, the weight of the bather being insufficient to dispel the air from this portion. As a result, the bather is generally seated in an elevated and unstable position on the water animal, and any substantial shifting of the position causes a displacement of air within the animal which upsets the balance of the bather.

With the above and other considerations in mind, it is proposed in accordance with the present invention to provide an improved water-sports device such as a rubber water animal which affords a safe and stable seat for the bather at all times. The invention further contemplates the provision of a water-sports device of the type described incorporating improved means whereby the device may be manipulated in a novel manner by the user. In addition, the new device has certain novel features of construction by means of which two or more of the animals may be connected together to provide water-sports floats of various forms.

The water-sports device of the present invention comprises generally a pneumatic body which when inflated assumes an elongated form, preferably resembling a fish, horse or the like, and at least one section which is formed to provide a seat for the bather. The pneumatic body is preferably made up of a plurality of inflatable units of rubber or other impermeable material, the adjacent units being connected together by the seat member which may be secured to the units by buckles or other suitable means, or which if desired may be formed integral with the inflatable units. The seat portion is normally disposed considerably below the top level of the device when the bodies are inflated, whereby the adjacent end portions of the units form an upraised front and back for the seat, and with this construction the bather is seated in a comfortable and stable position between the inflated units and is free to move about on the seat without causing any substantial displacement of air within the structure.

The new water animal also includes various other features of novelty which are described in connection with the accompanying drawing, in which:

Figure 1 is an elevation of a water-sports device incorporating the invention;

Figure 2 is a plan view of the device of Figure 1;

Figure 3 is a plan view of a modified form of device embodying the invention;

Figure 4 is a sectional view taken along the line 4—4 of Figure 3 and viewed in the direction of the arrows;

Figure 5 is a plan view of a further modification of the invention; and

Figure 6 is an elevation of the device of Figure 5.

Referring to the drawing, the device illustrated in Figures 1 and 2 comprises a body made up of two inflatable units 10 and 11 which are shaped in the form of the head and tail respectively of a fish and which are joined together in aligned relation by a flat flexible non-inflatable portion 12 of sufficient width to form a seat between the units. The device is preferably constructed with the seat portion 12 integral with the inflatable units 10 and 11 and to this end the body may be made of two sheets of rubber T and B which form the top and bottom of the device respectively. The sheets T and B are shaped with a narrowed portion in the middle and are joined together by a seam 15 along their outer edges and by spaced seams 16 and 17 extending across the opposite ends of the narrowed portion. With this construction, the spaced seams 16 and 17 prevent the displacement of air from one to the other of the inflated units, and also serve to define the ends of a seat between the units from which the air is excluded at all times. Suitable air valves 18 and 19 are provided in the walls of the respective units 10 and 11 inflating the device.

In one form of the invention, I prefer to provide suitable stirrups or foot rests for the device, which may be used to manipulate the device while in use. As shown in Figures 1 and 2, a pair of stirrup straps 21 carrying stirrups 22 may be suitably secured to the front unit 10 on the lower forward surface thereof. The stirrup straps 21 may be connected to the rear unit 11 of the device through suitable means such as the tie-straps 23. The tie-straps 23 are preferably crossed and their rearward ends suitably connected to the rear unit 11 at opposite sides thereof, as shown. Suitable end connecting straps 25, provided with buckles as shown, may be fixed to or formed integral with the rearward end of the rear unit 11 and similar straps 24 are preferably provided at the front end of the foward unit 10.

In the use of the device illustrated in Figures 1 and 2, the bather sits astride the inflated body on the flat seat portion 12, his feet extending into the stirrups 22. By manipulating the stirrups the bather may cause various life-like movements of the head of the animal and these movements may also be transmitted to the tail of the animal through the ties 23, the seat portion 12 affording a flexible connection which permits bending of the animal. Due to the fact that the seat portion 12 is disposed considerably below the upper surfaces of the inflated units 10 and 11, the device is quite stable and the user can maintain his balance thereon without undue effort. Several of the devices may be connected in line or in a circle by means of the end straps 24 and 25 and in this manner, multi-passenger watersports devices of various sizes and types may be obtained.

In a modified form of the invention shown in Figures 3 and 4, the device is made up of top and bottom sections 26 and 27 connected along their edges by a seam 29. Both of the sections 26 and 27 have a narrowed section 28 between their enlarged end sections, and seams 30 are provided to connect these narrowed sections at points adjacent but spaced from the longitudinal edge seams 29 thereof. The opposite ends of the center section side seams 30 are connected by transverse seams 32 which define the ends of the narrowed seat portion 28, as shown. If desired, the top and bottom sections may be united by cement or other means in the seat space 28 defined by the seams 30 and 32. With this construction, the narrow central portion 28 of the device provides a flat seat for the bather and divides the device into two inflatable units 34 and 35, the interiors of the units being connected by the air passages 36 formed between the seams 30 and 29 along the edges of the narrowed portion 28.

It will be apparent that in order to inflate the device shown in Figures 3 and 4, it is not necessary to introduce air separately into the units 34 and 35, a single valve 37 being sufficient for the purpose. The passages 36, while large enough to permit air flow between the units while they are being inflated, are not so large that a sudden displacement of air may take place from one unit to the other when the device is in use.

In a modified form of the invention shown in Figures 5 and 6, the two units 38 and 39 of the device are separately formed and are connected to a seat portion 40 of fabric or other suitable material. Each of the units 38 and 39 is formed of two sections joined along a seam 41 lying in a vertical plane, as shown. This form of connection permits the formation of vertical extensions such as the horse's neck and head 42 while using complementary sections of identical shape. Each of the units 38 and 39 is provided with an air valve 45 for use in inflating these units. The seat portion 40 is preferably releasably connected to the two end portions 38 and 39 by means of straps and buckles as shown at 43. The seat is also preferably provided with one or more snap fasteners 44 by means of which two complete devices may be connected together.

In the use of the device shown in Figure 5, the fabric portion 40 affords a comfortable seat for the bather and allows considerable flexing of the device. If desired, the fabric portion 40 may be disconnected from the units and replaced with a seat of a different form. For some amusements, it may be desirable to connect two of the devices together in crosswise relation and to this end, one of the devices may be placed across the other, and the seat portions 40 of the two connected by means of the fasteners 44.

Devices embodying my invention incorporate many advantageous features. Due to the provision of a seat portion suspended between two inflated float units, the user is in effect provided with a stable two-point support and can readily maintain his balance while propelling or manipulating the device with his hands and feet. The stirrup and tie-straps which may obviously be employed with all forms of the device, provide convenient means for steadying the user. Further, by means of these stirrups and tie-straps, the user may manipulate the device in many amusing ways, causing the forward and rearward units to submerge alternately to simulate a diving or jumping action or rocking the units from side to side to give a rolling effect. The front and rear connecting straps and seat fasteners permit several of the devices to be connected together in various relative positions whereby several bathers can simultaneously ride and manipulate a single floating amusement structure.

Among the variations to my invention it is obvious that it is possible to provide a succession of inflatable float units with seat portions interposed between them, thus forming a multi-passenger water-sports device.

I claim:

1. A water-sports device of the character described comprising two elongated inflatable float units, said units being aligned in a lengthwise direction and disposed in end-to-end relation, a flexible seat portion connected between the adjacent ends of said float units and flexible means at the outer end of each of said float units for connecting a plurality of said devices in end-to-end relation.

2. A water-sports device of the character described comprising elongated complementary upper and lower sections of flexible impervious material, each of said sections including elongated enlarged end portions aligned in a lengthwise direction and connected by a center portion of reduced width, means connecting said sections along their edges, transversely extending seam means connecting said sections across the opposite ends of said center portion whereby said center portion between said seams is cut off from the interiors of said end portions and means for introducing air to said end portions.

3. A water-sports device of the character described comprising two elongated substantially longitudinally aligned inflatable flexible float units, disposed in spaced end-to-end relation, a seat portion connected between said float units and a pair of independently movable stirrups secured to one of said float portions, whereby operation of the stirrups may impart movement to the float unit to which they are connected.

4. A water-sports device of the character described comprising two elongated substantially longitudinally aligned inflatable float units, disposed in spaced end-to-end relation, a seat portion connected between said float units, a pair of independently movable stirrups connected to and disposed beneath one of said float units and tie means independently connecting the respective stirrups with the other of said float units.

5. A water-sports device of the character described comprising two elongated substantially longitudinally aligned inflatable float units, disposed in spaced end-to-end relation, a seat portion connected between said float units, a pair of stirrups connected to and disposed beneath one of said float units and tie means separately connecting each of said stirrups with the other of said float units.

6. A water-sports device of the character described comprising two elongated substantially longitudinally aligned inflatable float units, disposed in spaced end-to-end relation, a seat portion connected between said float units, a pair of stirrups connected to one of said float units and suspended respectively beneath opposite sides of said device, and tie means separately connecting each of said stirrups with a point on the other of said float units on the opposite side of said device from that on which such stirrup is suspended.

7. A water-sports device of the character described comprising elongated complementary upper and lower sections of flexible impervious material, each of said sections including enlarged portions connected by a reduced intermediate portion, means connecting said sections along their edges, means uniting said sections substantially throughout their said reduced portions whereby the united intermediate portions form a flat saddle-like seat portion between the two hollow enlarged portions and means for introducing air to said enlarged portions.

8. A water-sports device of the character described comprising elongated complementary upper and lower sections of flexible impervious material, each of said sections including enlarged end portions connected by a reduced center portion, means connecting said sections along their edges, means uniting said sections substantially throughout their reduced center portions whereby the united center portions form a flat saddle-like seat portion between two hollow enlarged end portions, at least one air passage extending between the united reduced center portions and connecting the hollow enlarged end portions and means for introducing air to one of said hollow end portions.

9. A water-sports device comprising two spaced inflatable float units of flexible sheet material, a non-inflatable saddle-like seat portion extending between and connecting said float units and comprising interconnected integral layers of the sheet material forming said float units, an air passage between said interconnected layers of said seat portion connecting said float units and means for introducing air to one of said float units.

10. A water-sports device of the character described comprising elongated inflatable float units of flexible sheet material, said units being aligned in a lengthwise direction and disposed in spaced end-to-end relation, a non-inflatable flexible saddle-like seat portion connected between the adjacent ends of the adjacent float units below the upper surfaces thereof and comprising interconnected integral layers of the sheet material forming said float units, whereby said seat portion may be conveniently straddled and the adacent end portions of said float units may form upraised front and back supports for said seat portion, at least one restricted air passage through said seat portion connecting the adjacent inflatable float units and means on one of such interconnected float units for introducing air to both of said interconnected float units.

THOMAS J. HOWLAND.